(12) United States Patent
Amano

(10) Patent No.: US 7,046,304 B2
(45) Date of Patent: May 16, 2006

(54) NOISE REDUCTION CIRCUIT

(75) Inventor: Ryuhei Amano, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 571 days.

(21) Appl. No.: 10/397,877

(22) Filed: Mar. 27, 2003

(65) Prior Publication Data

US 2003/0189671 A1    Oct. 9, 2003

(30) Foreign Application Priority Data

Mar. 27, 2002   (JP)   ............... 2002-087971

(51) Int. Cl.
*H04N 5/21*   (2006.01)

(52) U.S. Cl. ............... 348/607; 348/701; 382/262

(58) Field of Classification Search ............... 348/607, 348/618, 606, 625, 628, 699, 700, 701; 382/262, 382/260–261, 263–266, 275; H04N 5/21
See application file for complete search history.

(56) References Cited

U.S. PATENT DOCUMENTS

| | | | |
|---|---|---|---|
| 5,142,537 A | 8/1992 | Kutner et al. | 714/747 |
| 5,231,680 A | 7/1993 | Williams | 382/261 |
| 5,490,094 A | 2/1996 | Heimburger et al. | 348/607 |
| 5,521,989 A | 5/1996 | Fan | 382/270 |
| 5,715,335 A | 2/1998 | De Haan et al. | 382/265 |
| 5,825,429 A | 10/1998 | Shirahata | 348/448 |
| 5,889,890 A | 3/1999 | Heimburger | 382/236 |

*Primary Examiner*—Michael H. Lee
(74) *Attorney, Agent, or Firm*—McDermott Will & Emery LLP

(57) ABSTRACT

A noise reduction circuit comprises correlation value calculation means for calculating correlation values in a plurality of directions centered at a pixel to be corrected; correction amount calculation means for calculating, on the basis of the correlation values in the plurality of directions calculated by the correlation value calculation means, a correction amount corresponding to the pixel to be corrected for each of the directions; first correction value calculation means for producing a plurality of candidates for correction values corresponding to the pixel to be corrected on the basis of the correction amount for each of the directions which is calculated by the correction amount calculation means; and second correction value calculation means for calculating the correction value for the pixel to be corrected from the plurality of candidates for correction values corresponding to the pixel to be corrected which are produced by the first correction value calculation means.

10 Claims, 14 Drawing Sheets

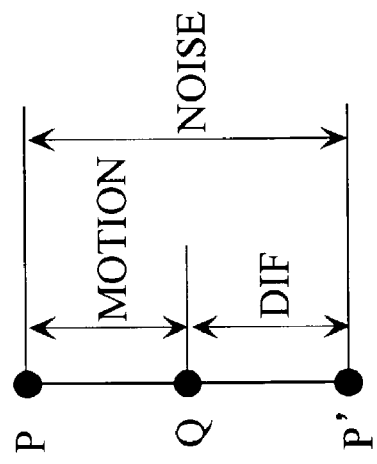
FIG. 16a
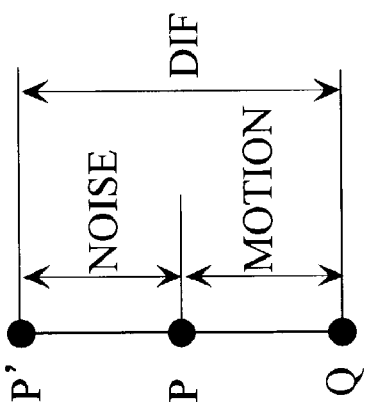
FIG. 16b
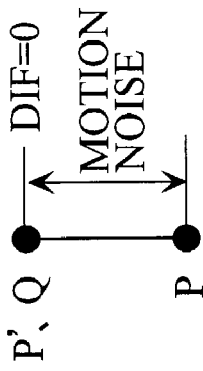
FIG. 16c
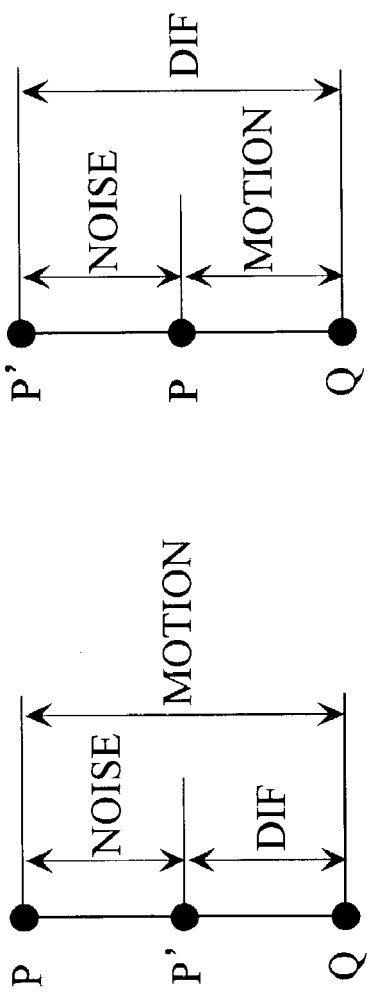
FIG. 16d
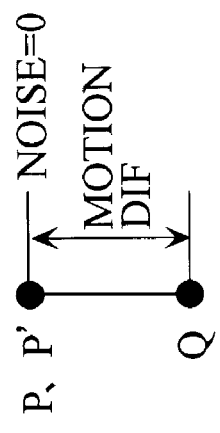
FIG. 16e
FIG. 16f
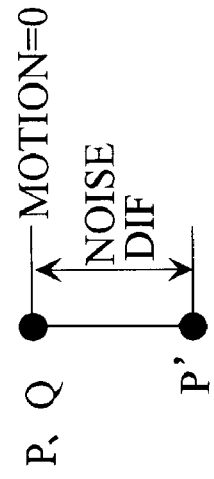
FIG. 16g

NOISE REDUCTION CIRCUIT

BACKGROUND OF THE INVENTION

1. Field of the Invention

The present invention relates to a noise reduction circuit.

2. Description of the Prior Art

In order to reduce noise included in an image signal, a cyclic filter, a median filter, or the like has been employed. If the effect of reducing noise is heightened, a contour portion and a pattern portion in a video are blurred, or a residual image occurs in a moving picture portion in the cyclic filter. Accordingly, the effect of reducing noise must be restrained.

SUMMARY OF THE INVENTION

An object of the present invention is to provide a noise reduction circuit capable of heightening the effect of reducing noise without blurring a contour portion or a pattern portion.

Another object of the present invention is to provide a noise reduction circuit capable of reducing noise, in a moving picture portion, where is difficult to reduce in a cyclic filter.

A first noise reduction circuit according to the present invention is characterized by comprising correlation value calculation means for calculating correlation values in a plurality of directions centered at a pixel to be corrected; correction amount calculation means for calculating, on the basis of the correlation values in the plurality of directions calculated by the correlation value calculation means, a correction amount corresponding to the pixel to be corrected for each of the directions; first correction value calculation means for producing a plurality of candidates for correction values corresponding to the pixel to be corrected on the basis of the correction amount for each of the directions which is calculated by the correction amount calculation means; and second correction value calculation means for calculating the correction value for the pixel to be corrected from the plurality of candidates for correction values corresponding to the pixel to be corrected which are produced by the first correction value calculation means.

An example of the correction amount calculation means is one, in a case where the number of directions in which correlation is strong is two or more, for calculating, in the direction in which correlation is strong, the correction amount corresponding to the pixel to be corrected such that the correction value for the pixel to be corrected is equal to the average of the pixel values of two pixels with the pixel to be corrected interposed therebetween in the direction, while calculating, in the direction in which correlation is weak, the correction amount such that the correction value for the pixel to be corrected is closer to the pixel value of the pixel to be corrected than the average of the pixel values of the two pixels with the pixel to be corrected interposed therebetween in the direction, and in a case where the number of directions in which correlation is strong is only one, for calculating, in the direction in which correlation is strong, the correction amount corresponding to the pixel to be corrected such that the correction value for the pixel to be corrected is equal to the average of the pixel values of two pixels with the pixel to be corrected interposed therebetween in the direction, and giving, in the direction in which correlation is weak, a correction amount which is as identical as possible to the correction amount calculated in the direction in which correlation is strong.

An example of the second correction value calculation means is one for calculating the average of the plurality of candidates for correction values corresponding to the pixel to be corrected which are produced by the first correction value calculation means, to calculate a correction value for the pixel to be corrected.

It is preferable that the noise reduction circuit further comprises movement amount calculation means for calculating the movement amount of the pixel to be corrected on the basis of the pixel value of the pixel to be corrected and a correction value for the same pixel position as that in the preceding frame, and control means for controlling the characteristics of the correction amount calculation means on the basis of the movement amount calculated by the movement amount calculation means. The control means controls the characteristics of the correction amount calculation means such that the correction amount calculated by the correction amount calculation means is increased depending on the movement amount when the movement amount is within a relatively small range.

It is preferable that the noise reduction circuit further comprises third correction value calculation means for calculating a final correction value for the pixel to be corrected. The third correction value calculation means calculates the final correction value for the pixel to be corrected on the basis of the correction value for the pixel to be corrected calculated by the second correction value calculation means, the pixel value of the pixel to be corrected, and a final correction value calculated by the third correction value calculation means in the preceding frame for a pixel at the same position as the pixel to be corrected.

A second noise reduction circuit according to the present invention is characterized by comprising correlation value calculation means for calculating correlation values in a plurality of directions centered at a pixel to be corrected; correction amount calculation means for calculating, on the basis of the correlation values in the plurality of directions calculated by the correlation value calculation means, a correction amount corresponding to the pixel to be corrected for each of the directions; correction amount determination means for calculating the average of the correction amounts for the directions calculated by the correction amount calculation means; and correction value calculation means for calculating a correction value for the pixel to be corrected on the basis of the average of the correction amounts for the directions calculated by the correction amount determination means.

An example of the correction amount calculation means is one, in a case where the number of directions in which correlation is strong is two or more, for calculating, in the direction in which correlation is strong, the correction amount corresponding to the pixel to be corrected such that the correction value for the pixel to be corrected is equal to the average of the pixel values of two pixels with the pixel to be corrected interposed therebetween in the direction, while calculating, in the direction in which correlation is weak, the correction amount such that the correction value for the pixel to be corrected is closer to the pixel value of the pixel to be corrected than the average of the pixel values of the two pixels with the pixel to be corrected interposed therebetween in the direction, and in a case where the number of directions in which correlation is strong is only one, for calculating, in the direction in which correlation is strong, the correction amount corresponding to the pixel to be corrected such that the correction value for the pixel to be corrected is equal to the average of the pixel values of two pixels with the pixel to be corrected interposed therebetween in the direction, and giving, in the direction in which correlation is weak, a correction amount which is as identical as possible to the correction amount calculated in the direction in which correlation is strong.

An example of the correction value calculation means is one for adding the pixel value of the pixel to be corrected to the average of the correction amounts for the directions calculated by the correction amount determination means, to calculate the correction value for the pixel to be corrected.

It is preferable that the noise reduction circuit further comprises movement amount calculation means for calculating the movement amount of the pixel to be corrected on the basis of the pixel value of the pixel to be corrected and a correction value for the same pixel position as that in the preceding frame, and control means for controlling the characteristics of the correction amount calculation means on the basis of the movement amount calculated by the movement amount calculation means. The control means controls the characteristics of the correction amount calculation means such that the correction amount calculated by the correction amount calculation means is increased depending on the movement amount when the movement amount is within a relatively small range.

It is preferable that the noise reduction circuit further comprises final correction value calculation means for calculating a final correction value for the pixel to be corrected. The final correction value calculation means calculates the final correction value for the pixel to be corrected on the basis of the correction value for the pixel to be corrected calculated by the correction value calculation means, the pixel value of the pixel to be corrected, and a final correction value calculated by the final correction value calculation means in the preceding frame for a pixel at the same position as the pixel to be corrected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 16a to 16g are schematic views for explaining the operation of a third correction value calculation unit 9.

DESCRIPTION OF THE PREFERRED EMBODIMENTS

1 Description of First Embodiment

[1-1] Description of Configuration of Noise Reduction Circuit

Figure 1:
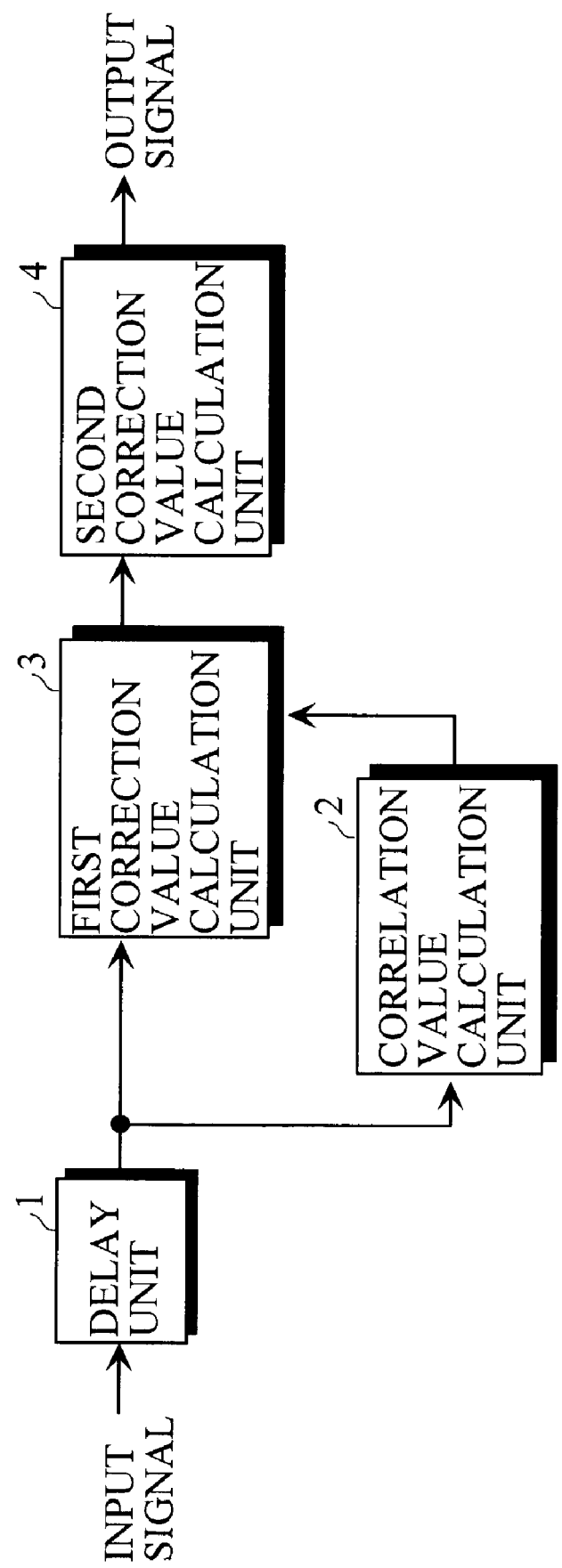
FIG. 1 is a block diagram showing the configuration of a noise reduction circuit according to a first embodiment.

FIG. 1 illustrates the configuration of a noise reduction circuit according to a first embodiment.

The noise reduction circuit comprises a delay unit 1, a correlation value calculation unit 2, a first correction value calculation unit 3, and a second correction value calculation unit 4.

The delay unit 1 is a delay unit for giving a pixel to be corrected and reference pixels peripheral to the pixel to be corrected to the correlation value calculation unit 2. The correlation value calculation unit 2 calculates correlation values in a plurality of directions centered at the pixel to be corrected.

The first correction value calculation unit 3 calculates, on the basis of the correlation values in the plurality of directions calculated by the correlation value calculation unit 2, a correction amount corresponding to the pixel to be corrected for each of the directions, and produces a plurality of candidates for correction values for the pixel to be corrected on the basis of the calculated correction amount. The second correction value calculation unit 4 calculates a final correction value from the plurality of candidates for correction values corresponding to the pixel to be corrected which are produced by the first correction value calculation unit 3.

[1-2] Description of Configuration of Delay Unit 1

Figure 2:
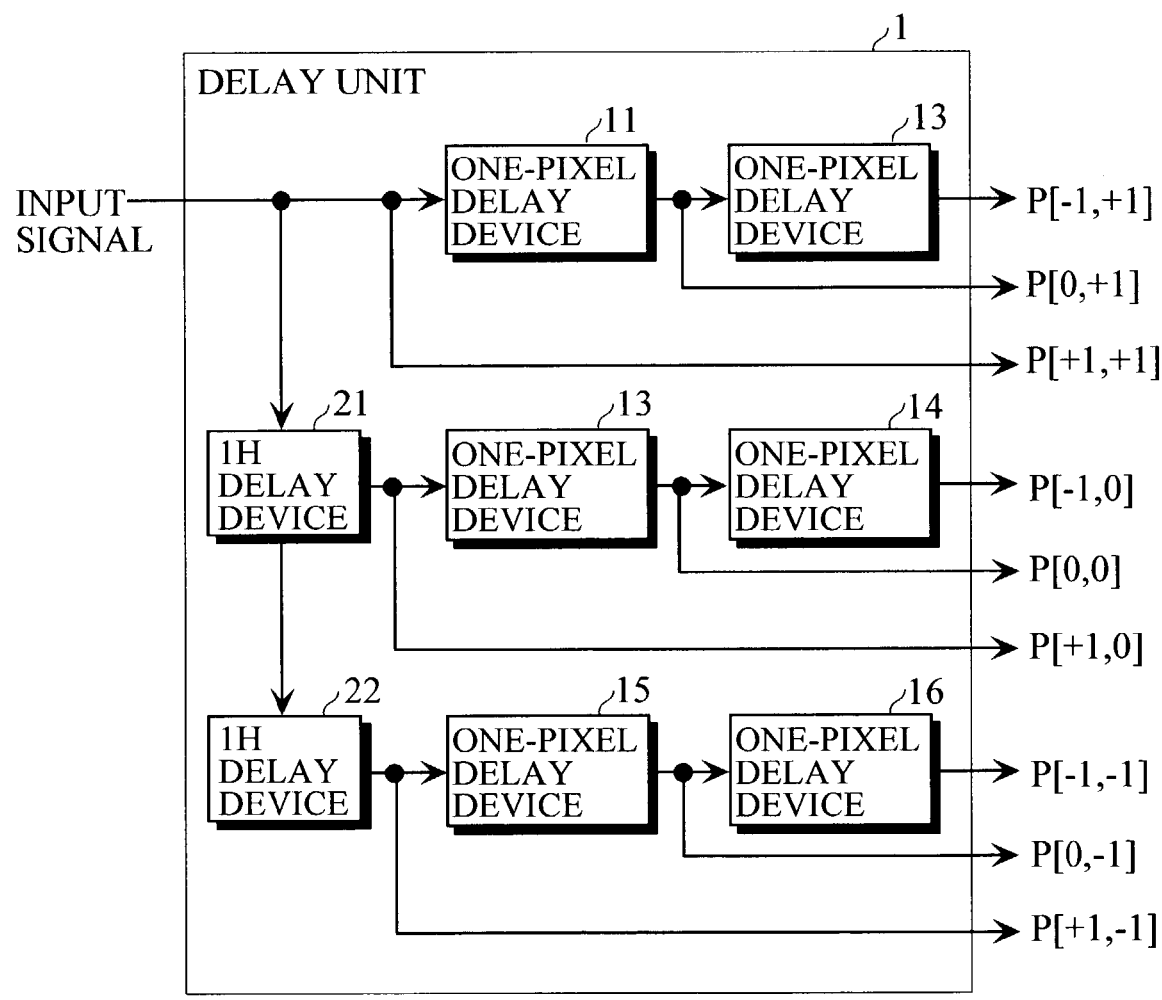
FIG. 2 is a block diagram showing the configuration of a delay unit 1.

FIG. 2 illustrates the configuration of the delay unit 1.

Figure 3:
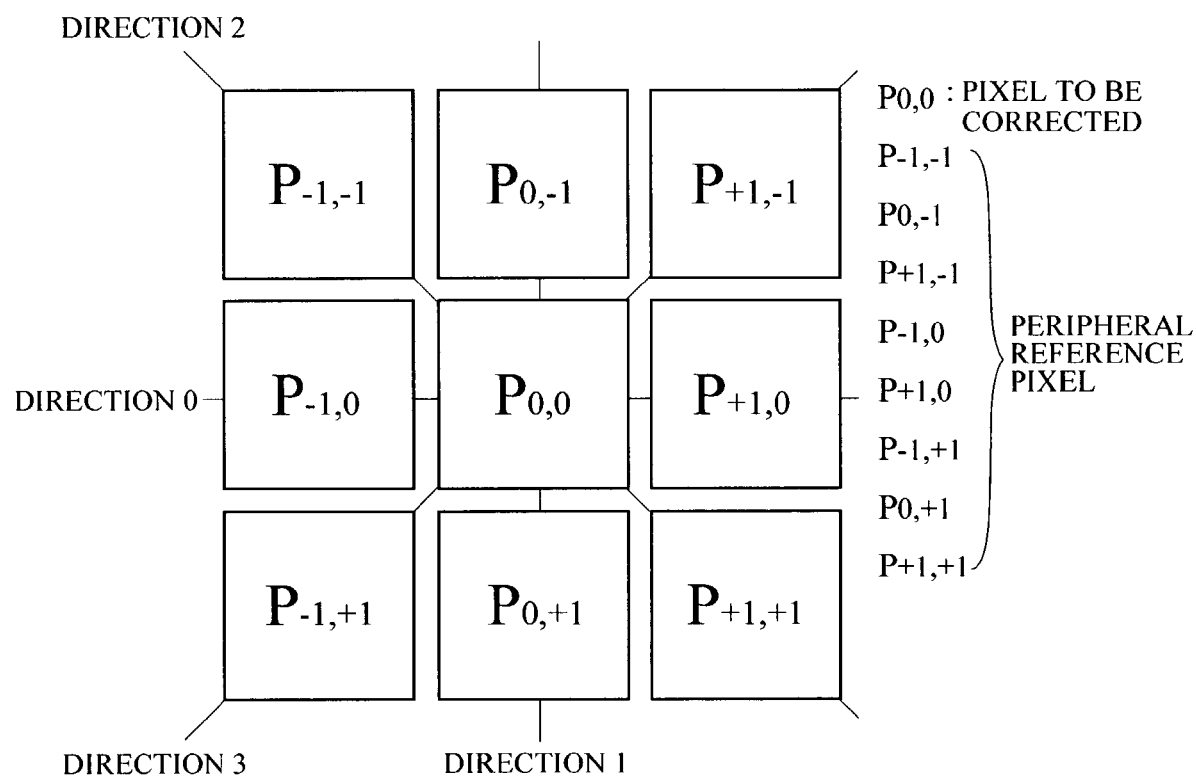
FIG. 3 is a schematic view showing, in a block measuring three pixels by three pixels centered at a pixel to be corrected, the pixel value P[n, m] of each of the pixels.

The delay unit 1 outputs, in a block measuring three pixels by three pixels centered at a pixel to be corrected, the pixel value P[n, m] (n=−1~+1, m=−1~+1) of each of the pixels, as shown in FIG. 3, and comprises two 1H delay devices 21 and 22 and six one-pixel delay devices 11 to 16. Each of the 1H delay devices 21 and 22 delays an input signal by one horizontal period, and outputs the delayed input signal. Each of the one-pixel delay devices 11 to 16 delays an input signal by one pixel period and outputs the delayed input signal.

[1-3] Description of Configuration of Correlation Value Calculation Unit 2

Figure 4:
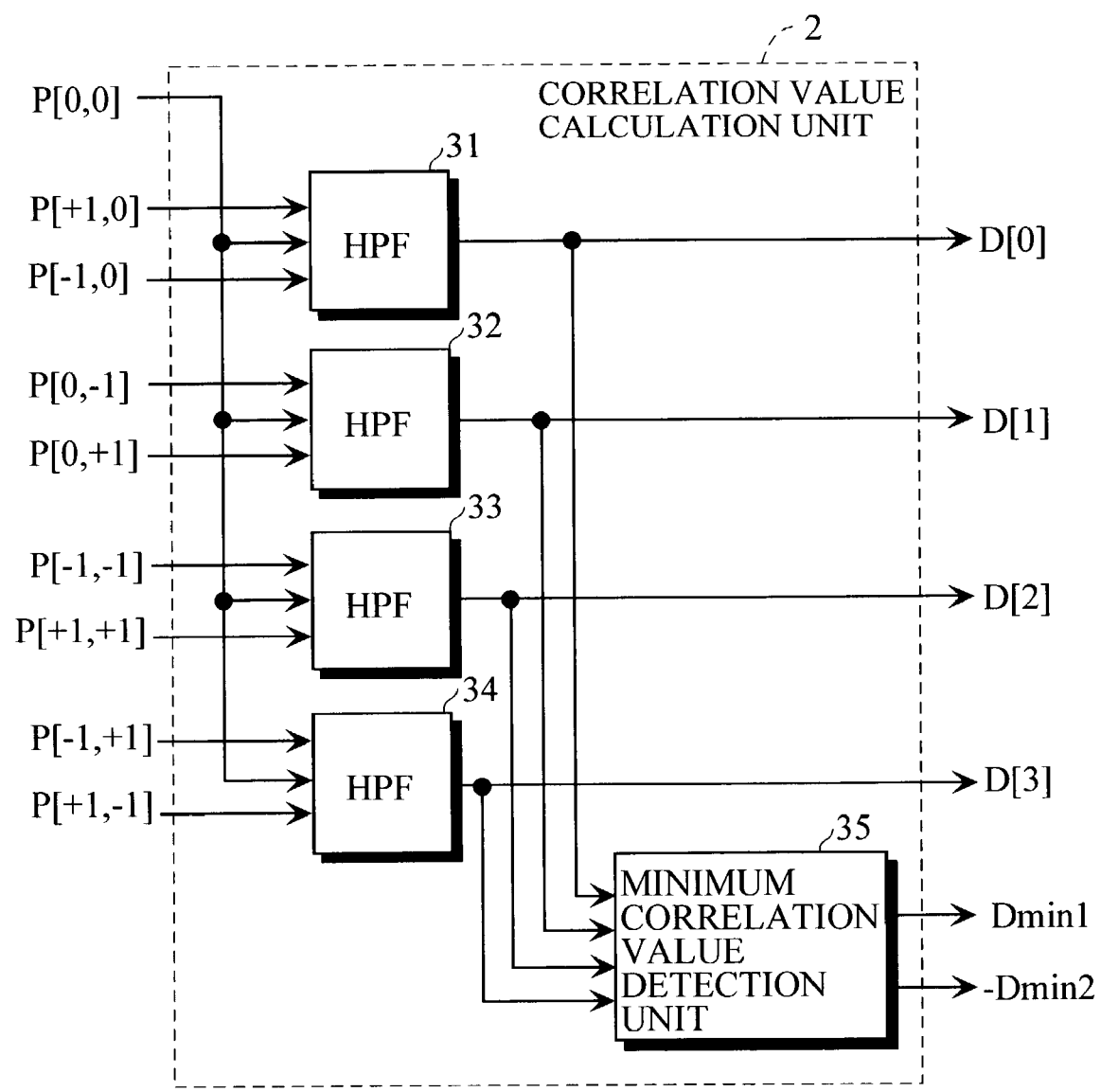
FIG. 4 is a block diagram showing the configuration of a correlation value calculation unit 2.

FIG. 4 illustrates the configuration of the correlation value calculation unit 2.

Figure 5A:
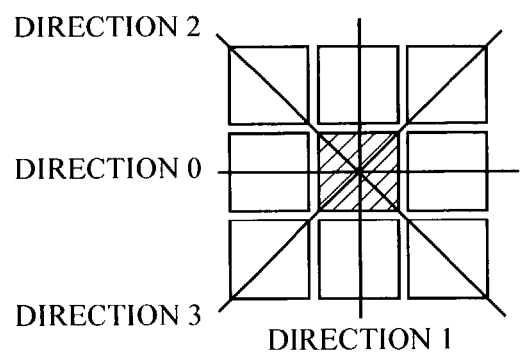
FIGS. 5a to 5d are schematic views showing the direction of a correlation value calculated by a correlation value calculation unit 2.
Figure 5B:
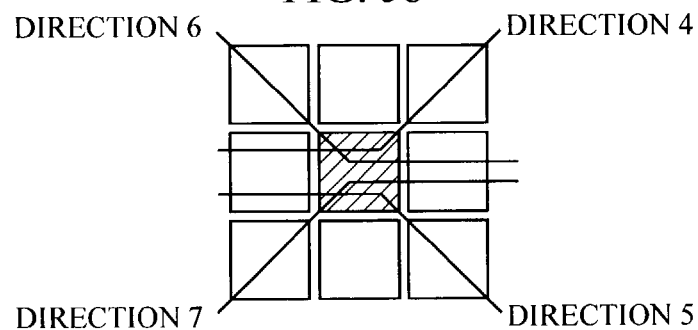
Figure 5C:
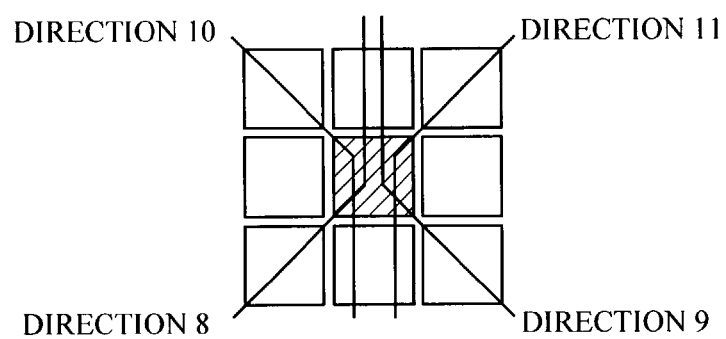
Figure 5D:
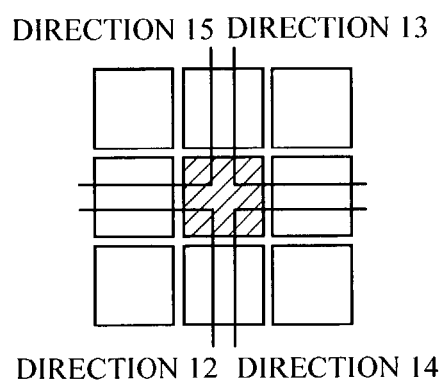

The correlation value calculation unit 2 comprises four HPFs (High Pass Filters) 31 to 34 for respectively calculating correlation values (contour components) in four directions centered at a pixel to be corrected shown in FIG. 5a, and a minimum correlation value detection unit 35. As the direction in which a correlation value is calculated, directions 4 to 7 shown in FIG. 5b may be added. Further, as the direction in which a correlation value is calculated, directions 8 to 11 shown in FIG. 5c may be added. Furthermore, as the direction in which a correlation value is calculated, directions 12 to 15 shown in FIG. 5d may be added.

The HPFs 31 to 34 respectively calculate correlation values D[0] to D[3] corresponding to directions 0 to 3 shown in FIG. 5a on the basis of the following equations (1) to (4):

$$D[0]=P[-1,0]+P[+1,0]-2P[0,0] \quad (1)$$

$$D[1]=P[0,-1]+P[0,+1]-2P[0,0] \quad (2)$$

$$D[2]=P[-1,-1]+P[+1,+1]-2P[0,0] \quad (3)$$

$$D[3]=P[+1,-1]+P[-1,+1]-2P[0,0] \quad (4)$$

The minimum correlation value detection unit 35 detects, out of the correlation values D[0] to D[3] respectively calculated by the HPFs 31 to 34, the minimum Dmin1 of the positive correlation values and a value −Dmin2 close to zero out of the negative correlation values.

In a case where the pixel value P[n, m] is composed of eight bits, when all the correlation values D[0] to D[3] are positive values, −511 is outputted as −Dmin2 from the minimum correlation value detection unit 35. On the other hand, when all the correlation values D[0] to D[3] are negative values, 511 is outputted as Dmin1 from the minimum correlation value detection unit 35.

[1-4] Description of Configuration of First Correction value Calculation Unit 3

Figure 6:
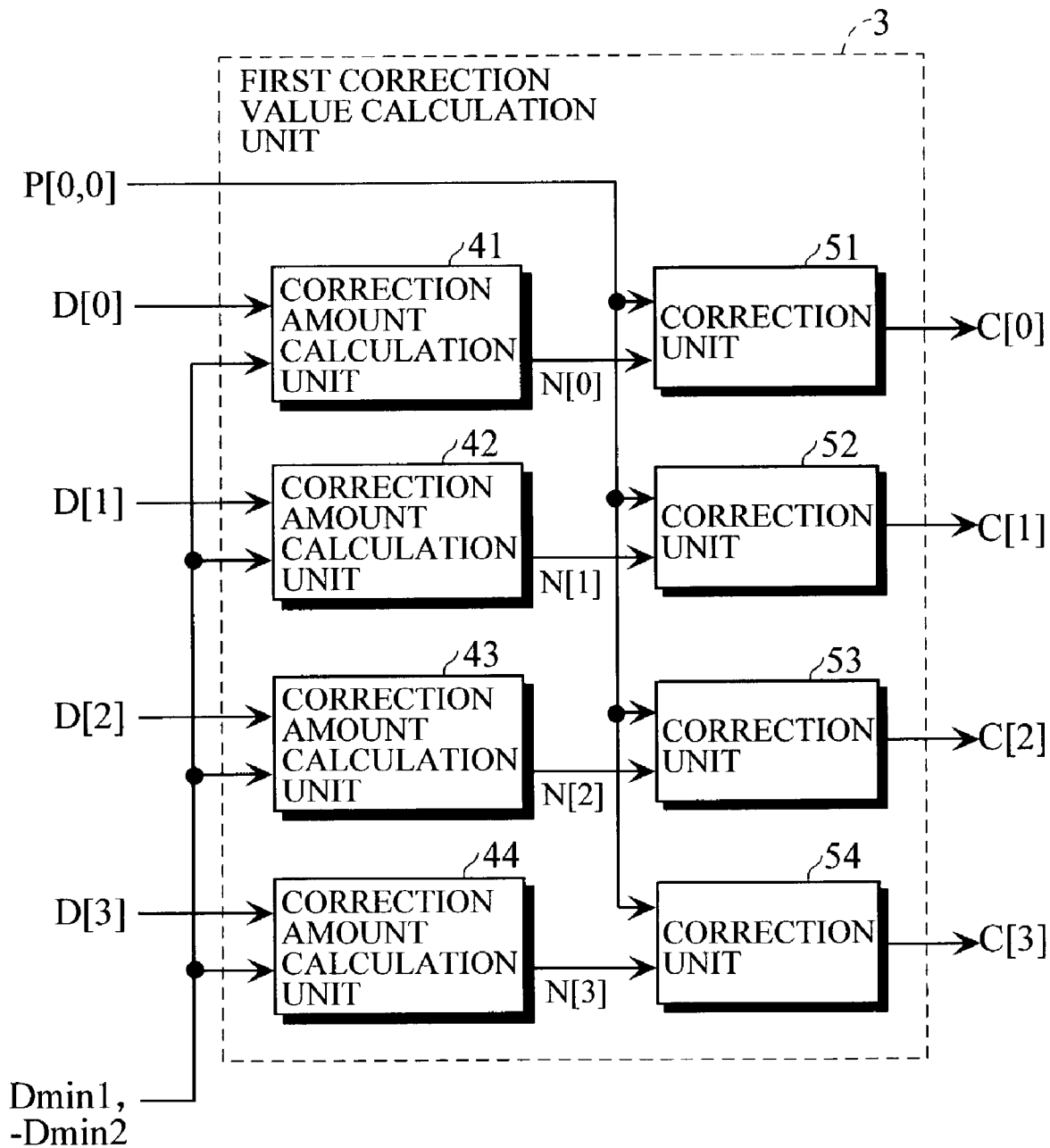
FIG. 6 is a block diagram showing the configuration of a first correction value calculation unit 3.

FIG. 6 illustrates the configuration of the first correction value calculation unit 3.

The first correction value calculation unit 3 comprises correction amount calculation units 41 to 44 for respectively calculating correction amounts [N0] to [N3] for the correlation values D[0] to D[3] corresponding to directions 0 to 3, and correction units 51 to 54 for respectively adding the pixel value P[0, 0] of the pixel to be corrected to the correction amounts [N0] to [N3] calculated by the correction amount calculation units 41 to 44, to produce correction values C[0] to C[3] corresponding to the pixel value P[0, 0] of the pixel to be corrected.

Figure 7A:
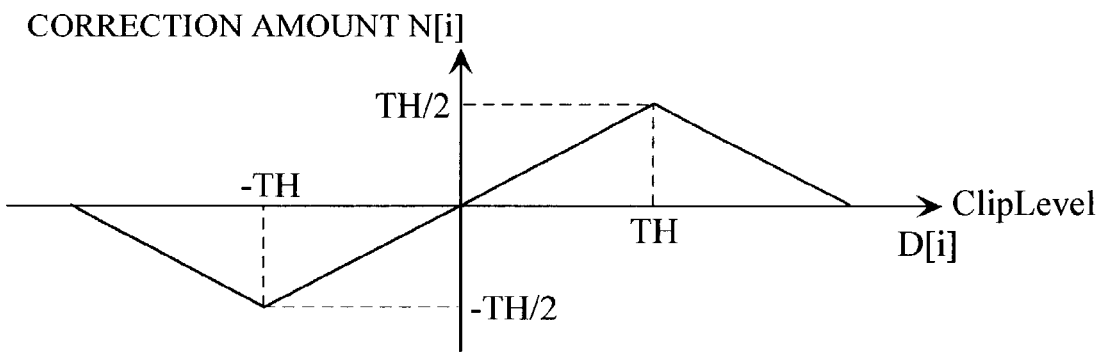
FIGS. 7a to 7c are graphs showing the input-output characteristics of each of correction amount calculation units 41 to 44.
Figure 7B:
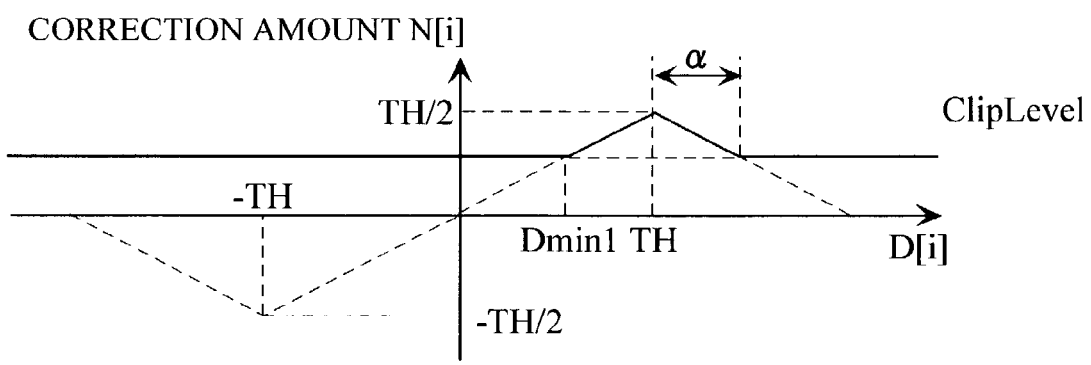
Figure 7C:
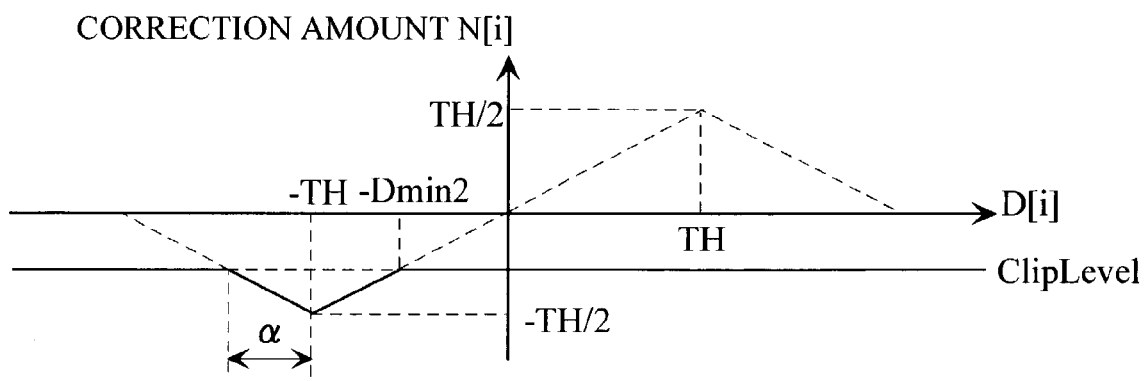

FIGS. 7*a*, 7*b*, and 7*c* illustrate the input-output characteristics of each of the correction amount calculation units 41 to 44.

FIG. 7*a* illustrates the characteristics in a case where Dmin1=|Dmin2|. In the characteristics shown in FIG. 7*a*, let TH be a predetermined threshold value. In this case, when an input signal D[i] (i=0 to 3) is within a range of −TH≦D[i]≦TH, the correction amount N[i] is obtained such that the correction value for the pixel to be corrected is equal to the average of the pixel values of the two pixels with the pixel to be corrected interposed therebetween in a corresponding direction.

Furthermore, when D[i]>TH, the correction amount N[i] is obtained such that the larger the input signal D[i] becomes, the closer the correction value for the pixel to be corrected is to the pixel value of the pixel to be corrected than the average of the pixel values of the two pixels with the pixel to be corrected interposed therebetween in a corresponding direction.

Furthermore, when D[i]<−TH, the correction amount N[i] is obtained such that the smaller the input signal D[i] becomes, the closer the correction value for the pixel to be corrected is to the pixel value of the pixel to be corrected than the average of the pixel values of the two pixels with the pixel to be corrected interposed therebetween in a corresponding direction.

FIG. 7*b* illustrates the characteristics in a case where Dmin1<|Dmin2|. The characteristics shown in FIG. 7*b* are the same as the characteristics shown in FIG. 7*a* within a range of Dmin1≦D[i]≦TH+α, while the correction amount N[i] is clipped on a correction amount in a case where the input signal D[i] is Dmin1 in the other range.

In the characteristics shown in FIG. 7*b*, when the input signal D[i] is a correlation value Dmin1 corresponding to the direction in which correlation is strong, the correction amount N[i] is obtained such that the correction value for the pixel to be corrected is equal to the average of the pixel values of the two pixels with the pixel to be corrected interposed therebetween in the direction.

When the input signal D[i] is a correlation value corresponding to a direction other than the direction in which correlation is strong, the correction amount N[i] is also obtained such that it is equal to a correction amount corresponding to the direction in which correlation is as strong as possible.

FIG. 7*c* illustrates the characteristics in a case where Dmin1>|Dmin2|. The characteristics shown in FIG. 7*c* are the same as the characteristics shown in FIG. 7*a* within a range of (−TH−α)≦D[i]≦−Dmin2, while the correction amount N[i] is clipped on a correction amount in a case where the input signal D[i] is Dmin2 in the other range.

In the characteristics shown in FIG. 7*c*, when the input signal D[i] is a correlation value −Dmin2 corresponding to the direction in which correlation is strong, the correction amount N[i] is obtained such that the correction value for the pixel to be corrected is equal to the average of the pixel values of the two pixels with the pixel to be corrected interposed therebetween in the direction.

When the input signal D[i] is a correlation value corresponding to a direction other than the direction in which correlation is strong, the correction amount N[i] is also obtained such that it is equal to a correction amount corresponding to the direction in which correlation is as strong as possible.

The correction amounts N[0] to N[3] calculated by the correction amount calculation units 41 to 44 are respectively inputted to corresponding correction units 51 to 54 in the succeeding stage. The pixel value P[0, 0] of the pixel to be corrected is also inputted to each of the correction units 51 to 54. The correction units 51 to 54 respectively add the inputted correction amounts N[0] to N[3] to the pixel value P[0, 0] of the pixel to be corrected, to produce the correction values C[0] to C[3].

When correlation is strong in one direction, therefore, each of the correction values C[0] to C[3] is approximately equal to the average of the pixel values of the two pixels with the pixel to be corrected interposed therebetween in the direction in which correlation is strong.

On the other hand, when correlation is strong in two or more directions, each of the correction values C[i] corresponding to the direction in which correlation is strong is approximately equal to the average of the pixel values of the two pixels with the pixel to be corrected interposed therebetween in the direction, and each of the correction values C[i] corresponding to the direction in which correlation is weak is a value close to the pixel value of the pixel to be corrected.

[1-5] Description of Configuration of Second Correction value Calculation Unit 4

Figure 8:
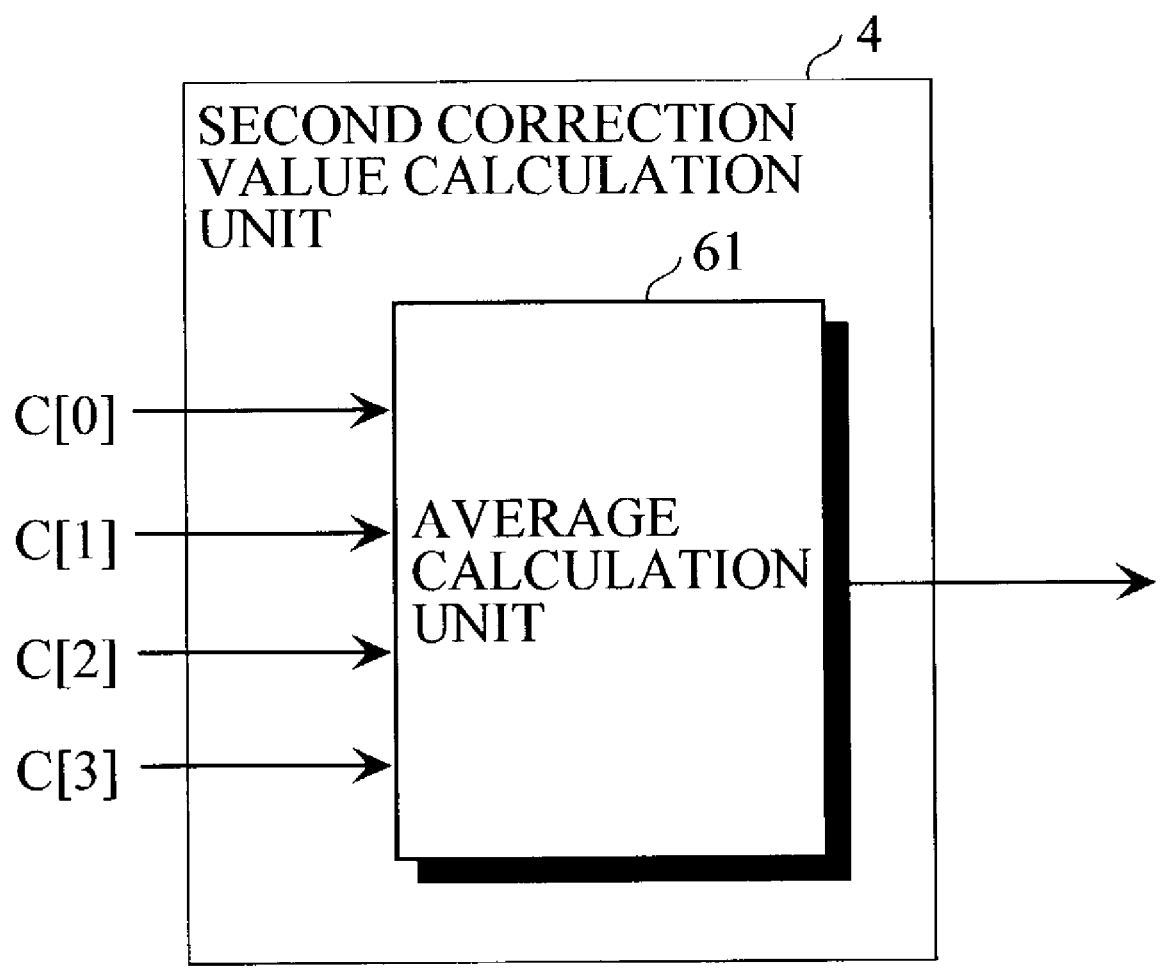
FIG. 8 is a block diagram showing the configuration of a second correction value calculation unit 4.

FIG. 8 illustrates the configuration of the second correction value calculation unit 4.

The second correction value calculation unit 4 is constituted by an average calculation unit 61. The average calculation unit 61 calculates the average $\{(C[0]+C[1]+C[2]+C[3])/b\ 4\}$ of the correction values C[0] to C[3] produced by the first correction value calculation unit 3, thereby producing a final correction value for the pixel to be corrected.

[1-6] Description of Specific Example

[1-6-1] Case Where There is Very Small Noise Component in Flat Region

Figure 9:
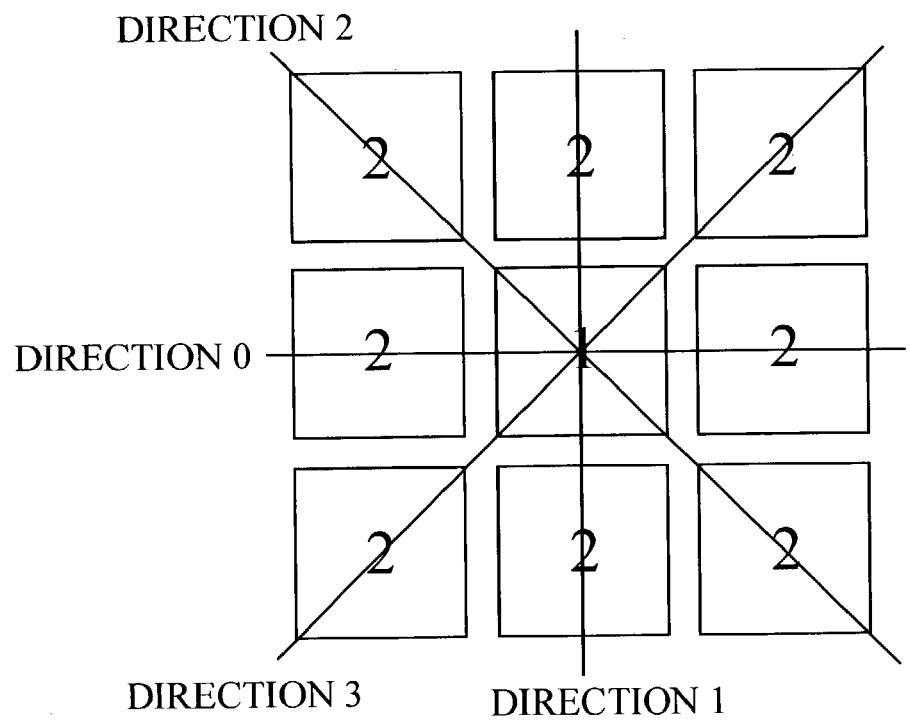
FIG. 9 is a schematic view showing a specific example in a case where there is a very small noise component in a flat region.

Description is made of a case where the pixel value of each of the pixels in the block measuring 3 pixels by 3 pixels centered at the pixel to be corrected is as shown in FIG. 9.

FIG. 9 illustrates an example in which all the pixel values of the pixels peripheral to the pixel to be corrected are "2", while the pixel value of the pixel to be corrected is "1" due to noise, although it is inherently "2".

In this case, correlation values D respectively corresponding to the directions 0 to 3 satisfy a relationship of D[0]=D[1]=D[2]=D[3]=2, as shown in Table 1, so that Dmin1=2 and −Dmin2=−511.

Figure 12:
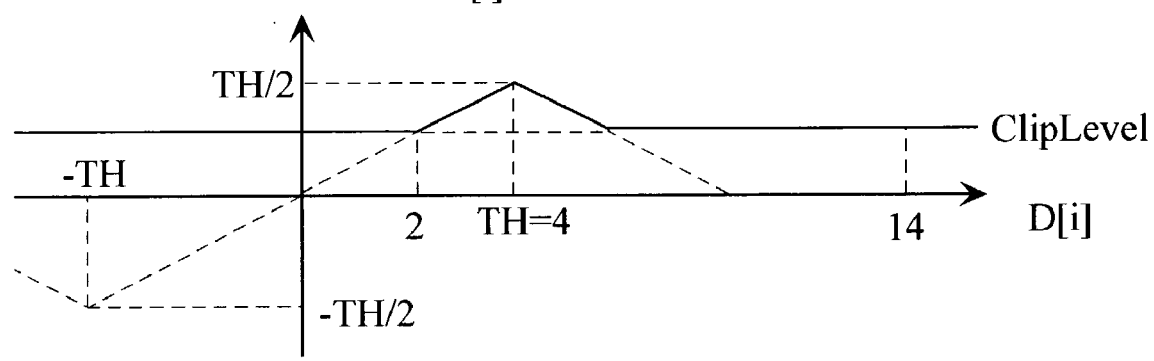
FIG. 12 is a graph showing the input-output characteristics of each of correction amount calculation units 41 to 44 which are applied to the specific example of FIG. 11.

Consequently, Dmin1<|−Dmin2|. When input-output characteristics used in each of the correction amount calculation units 41 to 44 are as shown in FIG. 12, letting TH=4. The correction amounts N[0] to N[3] respectively calculated by the correction amount calculation units 41 to 44 satisfy a relationship of N[0]=N[1]=N[2]=N[3]=1, as shown in Table 1.

TABLE 1

| Direction | 0 | 1 | 2 | 3 |
|---|---|---|---|---|
| Contour Component D | 2 + 2 − 2 × 1 = 2 | 2 + 2 − 2 × 1 = 2 | 2 + 2 − 2 × 1 = 2 | 2 + 2 − 2 × 1 = 2 |
| Correction Amount N | 1 | 1 | 1 | 1 |
| Correction Value 1 | 1 + 1 = 2 | 1 + 1 = 2 | 1 + 1 = 2 | 1 + 1 = 2 |

Figure 10:
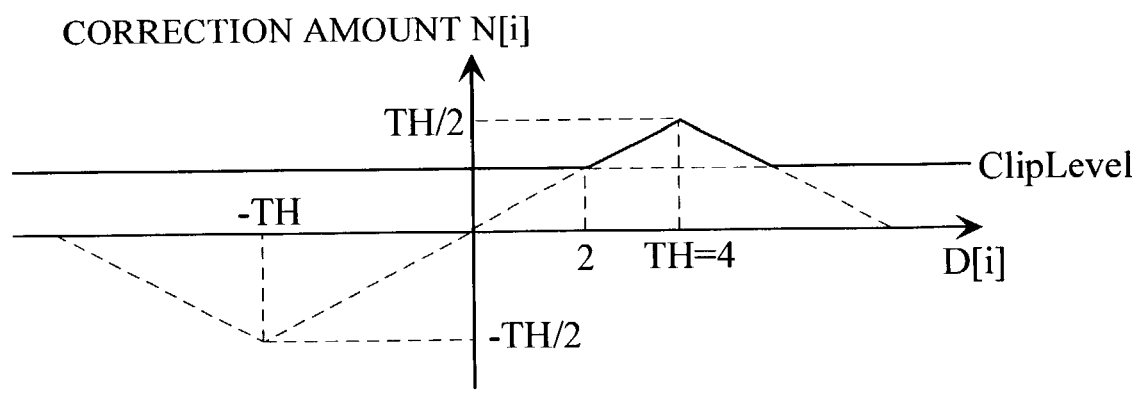
FIG. 10 is a graph showing the input-output characteristics of each of correction amount calculation units 41 to 44 which are applied to the specific example of FIG. 9.

Consequently, Dmin1<|−Dmin2|. When input-output characteristics used in each of the correction amount calculation units 41 to 44 are as shown in FIG. 10, letting TH=4. The correction amounts N[0] to N[3] respectively calculated by the correction amount calculation units 41 to 44 satisfy a relationship of N[0]=N[1]=N[2]=N[3]=1, as shown in Table 1.

The correction values C[0] to C[3] respectively calculated by the correction units 51 to 54 satisfy a relationship of C[0]=C[1]=C[2]=C[3]=1+1=2, in Table 1. Consequently, the final correction value for the pixel to be corrected which is produced by the second correction value calculation unit 4 is {(2+2+2+2)/4}=2, which is a value from which a noise component is reduced.

[1-6-2] Case Where There is Very Small Noise Component in Contour Portion

Figure 11:
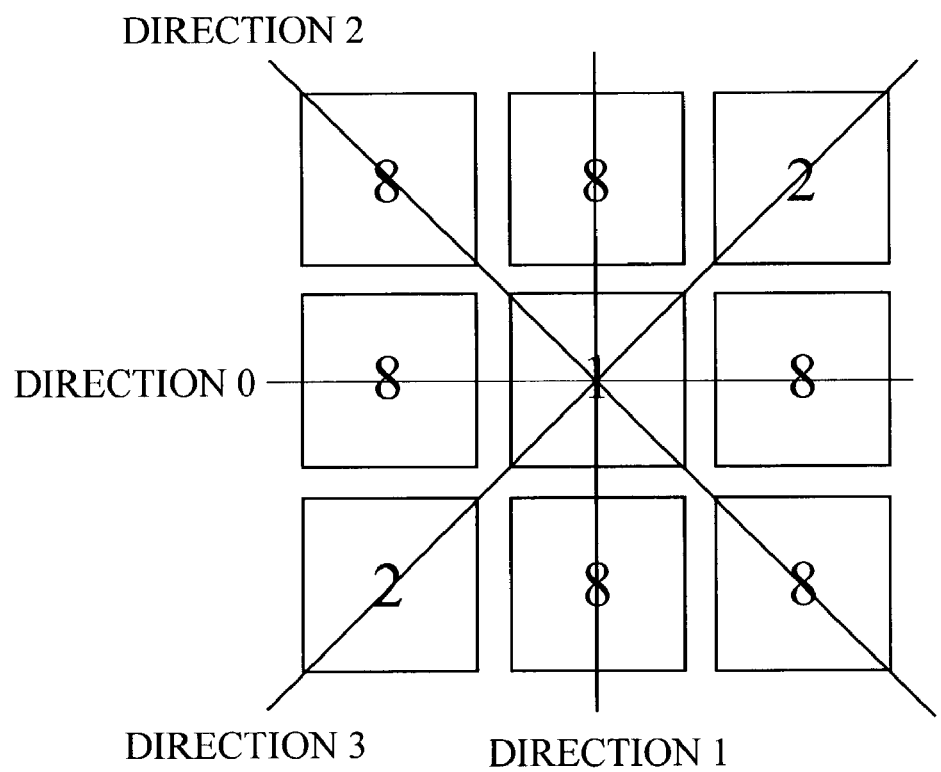
FIG. 11 is a schematic view showing a specific example of a case where there is a very small noise component in a contour portion.

Description is made of a case where the pixel value of each of the pixels in the block measuring 3 pixels by 3 pixels centered at the pixel to be corrected is as shown in FIG. 11.

In FIG. 11, the pixel value of the pixel to be corrected is "1", the pixel values of the two pixels with the pixel to be corrected interposed therebetween in the direction 3 are "2", and the pixel values of the other pixels are "8". FIG. 11 illustrates an example in which a contour portion exists along the direction 3, and the pixel value of the pixel to be corrected is "1" due to noise, although it is inherently "2" which is a pixel value in the contour portion along the direction 3.

In this case, correlation values D respectively corresponding to the directions 0 to 3 satisfy a relationship of D[0]=D[1]=D[2]=14 and D[3]=2, as shown in Table 2, so that Dmin1=2 and −Dmin2=−511. That is, the correction corresponding to the direction 3 is strong, so that the correlation value corresponding to the direction 3 is the minimum.

The correction values C[0] to C[3] respectively calculated by the correction units 51 to 54 satisfy a relationship of C[0]=C[1]=C[2]=C[3]=1+1=2, as shown in Table 2. Consequently, the final correction value for the pixel to be corrected which is produced by the second correction value calculation unit 4 is {(2+2+2+2)/4}=2, which is a value from which a noise component in the contour portion is reduced.

2 Description of Second Embodiment

Figure 13:
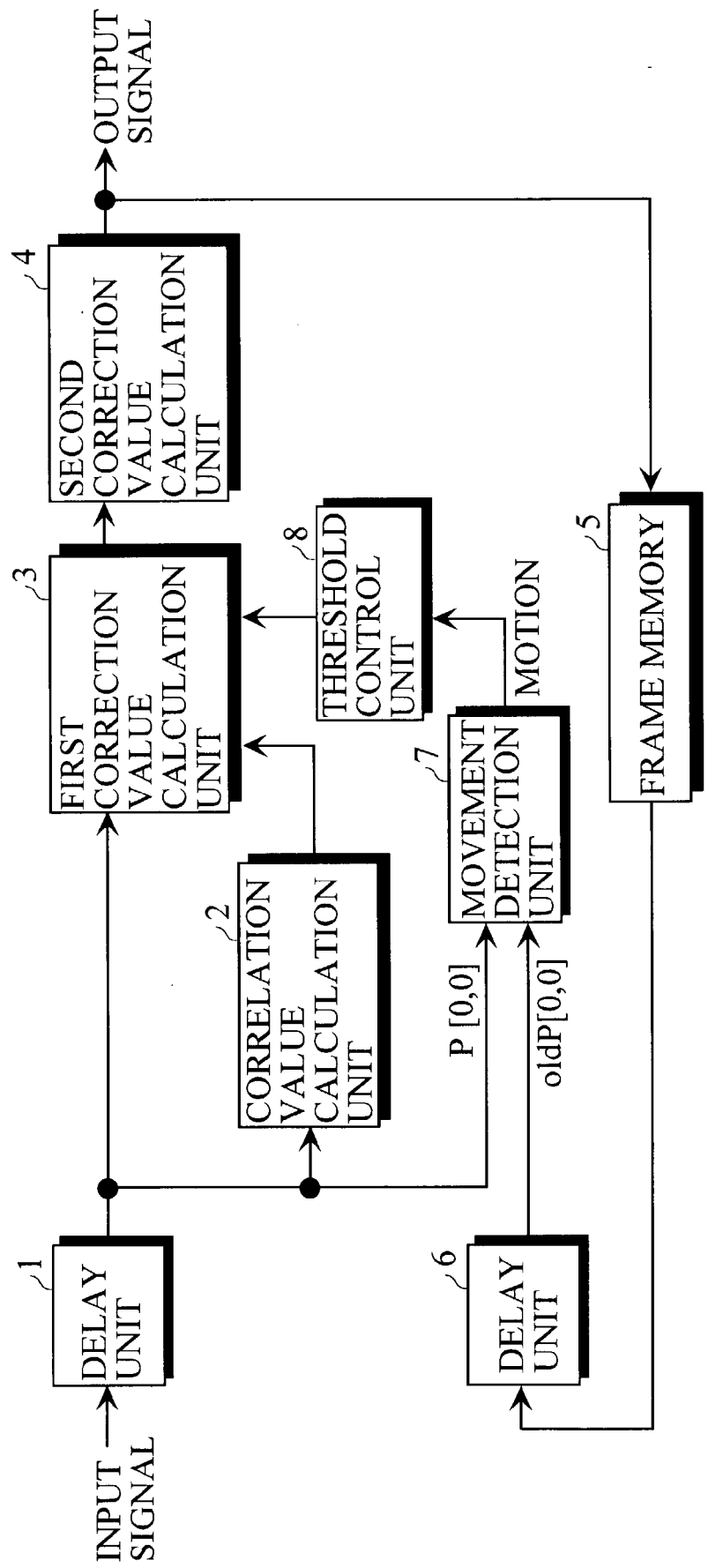
FIG. 13 is a block diagram showing the configuration of a noise reduction circuit according to a second embodiment.

FIG. 13 illustrates the configuration of a noise reduction circuit according to a second embodiment.

In FIG. 13, the same components as those shown in FIG. 1 are assigned the same reference numerals and hence, the description thereof is not repeated. The noise reduction circuit is obtained by adding a frame memory 5, a delay unit 6, a movement detection unit 7, and a threshold control unit 8 to the noise reduction circuit shown in FIG. 1, and differs from the noise reduction circuit shown in FIG. 1 in that a threshold value TH used in the first correction value calculation unit 3 is controlled by the threshold control unit 8.

A correction value obtained by the second correction value calculation unit 4 is outputted as a correction value for a pixel to be corrected, and is also fed to the frame memory 5. The correction value stored in the frame memory 5 is fed to the movement detection unit 7 through the delay unit 6.

The movement detection unit 7 calculates a movement amount MOTION corresponding to the pixel to be corrected by the following equation (5) on the basis of the pixel value P[0, 0] of the pixel to be corrected in the current frame which is outputted from the delay unit 1 and a correction value oldP[0, 0] corresponding to the same pixel position as that

TABLE 2

| Direction | 0 | 1 | 2 | 3 |
|---|---|---|---|---|
| Contour Component D | 8 + 8 − 2 × 1 = 14 | 8 + 8 − 2 × 1 = 14 | 8 + 8 − 2 × 1 = 14 | 2 + 2 − 2 × 1 = 2 |
| Correction Amount N | 1 | 1 | 1 | 1 |
| Correction Value 1 | 1 + 1 = 2 | 1 + 1 = 2 | 1 + 1 = 2 | 1 + 1 = 2 | in the preceding frame which is outputted from the delay unit 6:

$$\text{MOTION}=|P[0,0]-\text{old}P[0,0]| \quad (5)$$

The movement amount MOTION corresponding to the pixel to be corrected which is calculated by the movement detection unit 7 is fed to the threshold control unit 8. The threshold control unit 8 controls the threshold value TH used in each of the correction amount calculation units 41 to 44 in the first correction value calculation unit 3 (see FIG. 6) on the basis of the movement amount MOTION corresponding to the pixel to be corrected.

Figure 14:
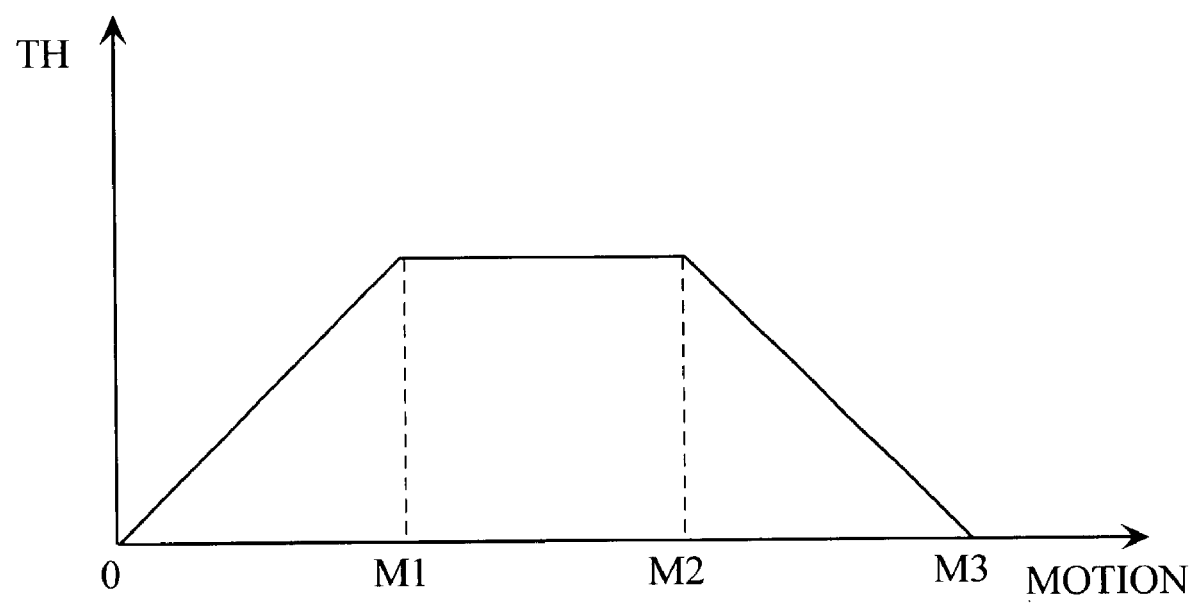
FIG. 14 is a graph showing the input-output characteristics of a threshold control unit 8.

FIG. 14 illustrates the input-output characteristics of the threshold control unit 8.

When the movement amount MOTION is within a range of 0 to M1, the threshold value TH gradually increases in proportion to the movement amount MOTION. When the movement amount MOTION is within a range of M1 to M2, the threshold value TH becomes constant. When the movement amount MOTION is within a range of M2 to M3, the threshold value TH gradually decreases in proportion to the movement amount MOTION.

As apparent from FIG. 7, the correction amount N[i] increases when a large value is set as the threshold value TH, while decreasing when a small value is set as the threshold value TH.

When the movement amount MOTION is zero, it is judged that there is no noise, so that the threshold value TH is set to zero. In this case, therefore, the correction amount N[i] becomes zero.

When the movement amount MOTION is in a small range (0~M1), the calculated movement amount MOTION may be caused by noise, so that the threshold value TH is gradually increased. In this case, therefore, the correction amount N[i] gradually increases.

When the movement amount MOTION is in an intermediate range (M1~M2), the threshold value TH is made constant such that the correction amount N[i] is not too large.

When the movement amount MOTION is in a large range (M2~M3), the calculated movement amount MOTION may be caused by not noise but the movement of a video, so that the threshold value TH is gradually decreased. In this case, therefore, the correction amount N[i] gradually decreases.

When the movement amount MOTION is in a very large range (M3 or more), it is judged that the calculated movement amount MOTION is caused by the movement of a video, to set the threshold value TH to zero. In this case, therefore, the correction amount N[i] becomes zero.

3 Description of Third Embodiment

Figure 15:
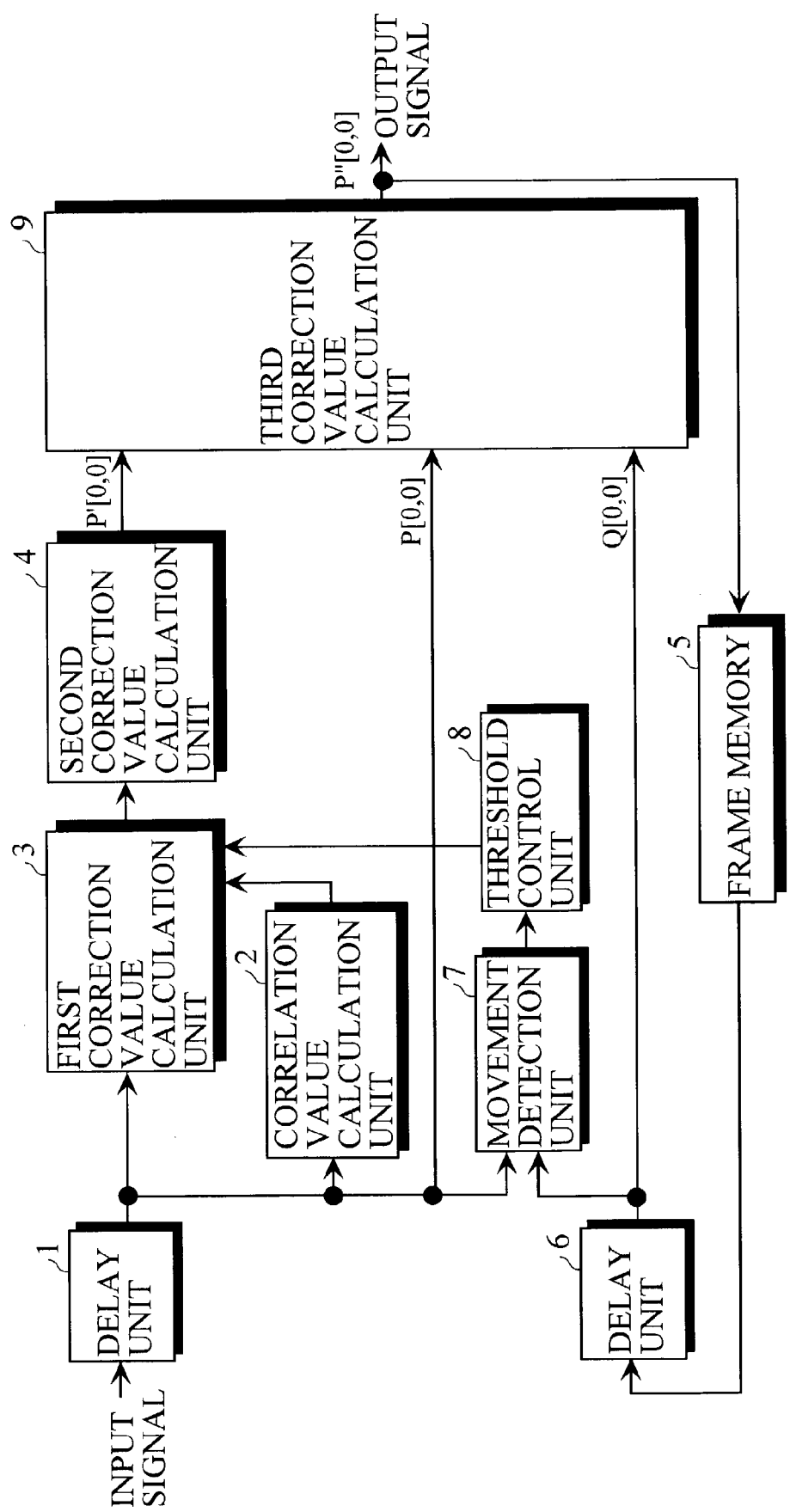
FIG. 15 is a block diagram showing the configuration of a noise reduction circuit according to a third embodiment.

FIG. 15 illustrates the configuration of a noise reduction circuit according to a third embodiment.

In FIG. 15, the same components as those shown in FIG. 13 are assigned the same reference numerals and hence, the description thereof is not repeated. The noise reduction circuit is obtained by adding a third correction value calculation unit 9 to the noise reduction circuit shown in FIG. 13. The third correction value calculation unit 9 outputs a final correction value P"[0, 0] corresponding to a pixel to be corrected, as described later.

Not an output P'[0, 0] of a second correction value calculation unit 4 but an output P"[0, 0] of the third correction value calculation unit 9 is inputted to a frame memory 5. The correction value P'[0, 0] corresponding to the pixel to be corrected which is produced by the second correction value calculation unit 4, the pixel value P[0, 0] of the pixel to be corrected, and a final correction value Q[0, 0] corresponding to the same pixel position as that in the preceding frame are inputted to the third correction value calculation unit 9.

The third correction value calculation unit 9 calculates the final correction value P"[0, 0] corresponding to the pixel to be corrected and outputs the calculated correction value on the basis of P'[0, 0], P[0, 0], and Q[0, 0].

Referring to FIGS. 16*a* to 16*g*, description is made of the operation of the third correction value calculation unit 9. In the following description, P[0, 0] indicates the current pixel value, P'[0, 0] indicates a second correction value calculation unit output value, and Q[0, 0] indicates a pixel value in the preceding frame. Further, K ($0 \leq K \leq 1$) is a weighting factor.

In FIGS. 16*a* to 16*g*, MOTION, NOISE, and DIF are defined as expressed by the following equation (6):

$$\text{MOTION}=|Q[0,0]-P[0,0]|$$

$$\text{NOISE}=|P'[0,0]-P[0,0]|$$

$$\text{DIF}=|P'[0,0]-Q[0,0]| \quad (6)$$

The third correction value calculation unit 9 controls three types, described below, depending on the relationship among P'[0, 0], P[0, 0] and Q[0, 0].

(1) When the relationship among P'[0, 0], P[0, 0] and Q[0, 0] is a case shown in FIG. 16*a*, 16*e*, 16*f*, or 16*g*, the third correction value calculation unit 9 outputs the second correction value calculation unit output value P'[0, 0].

In the cases shown in FIGS. 16*a* and 16*f*, it is judged that the second correction value calculation unit output value P'[0, 0] is a value from which noise appearing in the current pixel value P[0, 0] is reduced.

In the cases shown in FIGS. 16*e* and 16*g*, it is judged that the second correction value calculation unit output value P'[0, 0] is equal to the current pixel value P[0, 0], and no noise appears in the current pixel value P[0, 0].

(2) When the relationship among P'[0, 0], P[0, 0] and Q[0, 0] is the case shown in FIG. 16*b* or 16*d*, the second correction value calculation unit output value P'[0, 0] is at a position on the opposite side of the pixel value Q[0, 0] in the preceding frame centered at the current pixel value P[0, 0] or the position of the current pixel value P[0, 0]. Accordingly, the third correction value calculation unit 9 controls the second correction value calculation unit output value P'[0, 0] so as to come closer to the current pixel value P[0, 0]

(3) When the relationship among P'[0, 0], P[0, 0] and Q[0, 0] is the case shown in FIG. 16*c*, the second correction value calculation unit output value P'[0, 0] is at a position on the opposite side of the current pixel value P[0, 0] centered at the pixel value Q[0, 0] in the preceding frame. Accordingly, the third correction value calculation unit 9 controls the second correction value calculation unit output value P'[0, 0] so as to come closer to the pixel value Q[0, 0] in the preceding frame.

The foregoing control is summarized, as expressed by the following equation (7):

(1) NOISE+DIF$\leq$MOTION . . . (FIG. 16*a*, FIG. 16*e*, FIG. 16*f*, FIG. 16*g*)

$$P''[0,0]=(1-k)*P[0,0]+k*P'[0,0] \, (k=1)$$

(2) NOISE+DIF>MOTION and NOISE−DIF$\leq$0 . . . (FIG. 16*b*, FIG. 16*d*)

$$P''[0,0]=(1-k)*P[0,0]+k*P'[0,0] \, (k<1)$$

(3) NOISE+DIF>MOTION and NOISE−DIF>0 ... (FIG. 16c)

$$P''[0,0]=(1-k)*Q[0,0]+k*P'[0,0](k<1) \quad (7)$$

In the above-mentioned embodiment, the first correction value calculation unit 3 adds the pixel value P[0, 0] of the pixel to be corrected to the correction amounts N[0] to N[3] for the correlation values D[0] to D[3], to respectively calculate the correction values C[0] to C[3] corresponding to the pixel to be corrected, and the second correction value calculation unit 4 calculates the average of the correction values C[0] to C[3] corresponding to the pixel to be corrected which are calculated by the first correction value calculation unit 3.

However, the first correction value calculation unit 3 may be replaced with a correction amount determination unit for calculating the average value {(N[0]+N[1]+N[2]+N[3])/4} of the respective correction amounts N[0] to N[3] for the correlation values D[0] to D[3], and the second correction value calculation unit 4 may be replaced with a correction value calculation unit for adding the pixel value P[0, 0] of the pixel to be corrected to the average value { (N[0]+N[1]+N[2]+N[3])/4} calculated by the correction amount determination unit.

The above-mentioned noise reduction circuit may be provided in the succeeding stage of a cyclic noise reduction circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A noise reduction circuit comprising:
   correlation value calculation means for calculating correlation values in a plurality of directions centered at a pixel to be corrected;
   correction amount calculation means for calculating, on the basis of the correlation values in the plurality of directions calculated by the correlation value calculation means, a correction amount corresponding to the pixel to be corrected for each of the directions;
   first correction value calculation means for producing a plurality of candidates for correction values corresponding to the pixel to be corrected on the basis of the correction amount for each of the directions which is calculated by the correction amount calculation means; and
   second correction value calculation means for calculating the correction value for the pixel to be corrected from the plurality of candidates for correction values corresponding to the pixel to be corrected which are produced by the first correction value calculation means.

2. The noise reduction circuit according to claim 1, wherein
   in a case where the number of directions in which correlation is strong is two or more, the correction amount calculation means calculates, in the direction in which correlation is strong, the correction amount corresponding to the pixel to be corrected such that the correction value for the pixel to be corrected is equal to the average of the pixel values of two pixels with the pixel to be corrected interposed therebetween in the direction, while calculating, in the direction in which correlation is weak, the correction amount such that the correction value for the pixel to be corrected is closer to the pixel value of the pixel to be corrected than the average of the pixel values of the two pixels with the pixel to be corrected interposed therebetween in the direction, and
   in a case where the number of directions in which correlation is strong is only one, the correction amount calculation means calculates, in the direction in which correlation is strong, the correction amount corresponding to the pixel to be corrected such that the correction value for the pixel to be corrected is equal to the average of the pixel values of two pixels with the pixel to be corrected interposed therebetween in the direction, and giving, in the direction in which correlation is weak, a correction amount which is as identical as possible to the correction amount calculated in the direction in which correlation is strong.

3. The noise reduction circuit according to claim 1, wherein
   the second correction value calculation means calculates the average of the plurality of candidates for correction values corresponding to the pixel to be corrected which are produced by the first correction value calculation means, to calculate a correction value for the pixel to be corrected.

4. The noise reduction circuit according to claim 1, further comprising
   movement amount calculation means for calculating the movement amount of the pixel to be corrected on the basis of the pixel value of the pixel to be corrected and a correction value for the same pixel position as that in the preceding frame, and
   control means for controlling the characteristics of the correction amount calculation means on the basis of the movement amount calculated by the movement amount calculation means,
   the control means controlling the characteristics of the correction amount calculation means such that the correction amount calculated by the correction amount calculation means is increased depending on the movement amount when the movement amount is within a relatively small range.

5. The noise reduction circuit according to claim 1, further comprising
   third correction value calculation means for calculating a final correction value for the pixel to be corrected,
   the third correction value calculation means calculating the final correction value for the pixel to be corrected on the basis of the correction value for the pixel to be corrected calculated by the second correction value calculation means, the pixel value of the pixel to be corrected, and a final correction value calculated by the third correction value calculation means in the preceding frame for a pixel at the same position as the pixel to be corrected.

6. A noise reduction circuit comprising:
   correlation value calculation means for calculating correlation values in a plurality of directions centered at a pixel to be corrected;
   correction amount calculation means for calculating, on the basis of the correlation values in the plurality of directions calculated by the correlation value calculation means, a correction amount corresponding to the pixel to be corrected for each of the directions;

correction amount determination means for calculating the average of the correction amounts for the directions calculated by the correction amount calculation means; and correction value calculation means for calculating a correction value for the pixel to be corrected on the basis of the average of the correction amounts for the directions calculated by the correction amount determination means.

7. The noise reduction circuit according to claim 6, wherein in a case where the number of directions in which correlation is strong is two or more, the correction amount calculation means calculates, in the direction in which correlation is strong, the correction amount corresponding to the pixel to be corrected such that the correction value for the pixel to be corrected is equal to the average of the pixel values of two pixels with the pixel to be corrected interposed therebetween in the direction, while calculating, in the direction in which correlation is weak, the correction amount such that the correction value for the pixel to be corrected is closer to the pixel value of the pixel to be corrected than the average of the pixel values of the two pixels with the pixel to be corrected interposed therebetween in the direction, and in a case where the number of directions in which correlation is strong is only one, the correction amount calculation means calculates, in the direction in which correlation is strong, the correction amount corresponding to the pixel to be corrected such that the correction value for the pixel to be corrected is equal to the average of the pixel values of two pixels with the pixel to be corrected interposed therebetween in the direction, and giving, in the direction in which correlation is weak, a correction amount which is as identical as possible to the correction amount calculated in the direction in which correlation is strong.

8. The noise reduction circuit according to claim 6, wherein the correction value calculation means adds the pixel value of the pixel to be corrected to the average of the correction amounts for the directions calculated by the correction amount determination means, to calculate the correction value for the pixel to be corrected.

9. The noise reduction circuit according to claim 6, further comprising movement amount calculation means for calculating the movement amount of the pixel to be corrected on the basis of the pixel value of the pixel to be corrected and a correction value for the same pixel position as that in the preceding frame, and control means for controlling the characteristics of the correction amount calculation means on the basis of the movement amount calculated by the movement amount calculation means, the control means controlling the characteristics of the correction amount calculation means such that the correction amount calculated by the correction amount calculation means is increased depending on the movement amount when the movement amount is within a relatively small range.

10. The noise reduction circuit according to claim 6, further comprising final correction value calculation means for calculating a final correction value for the pixel to be corrected, the final correction value calculation means calculating the final correction value for the pixel to be corrected on the basis of the correction value for the pixel to be corrected calculated by the correction value calculation means, the pixel value of the pixel to be corrected, and a final correction value calculated by the final correction value calculation means in the preceding frame for a pixel at the same position as the pixel to be corrected.

* * * * *